Figure 1:
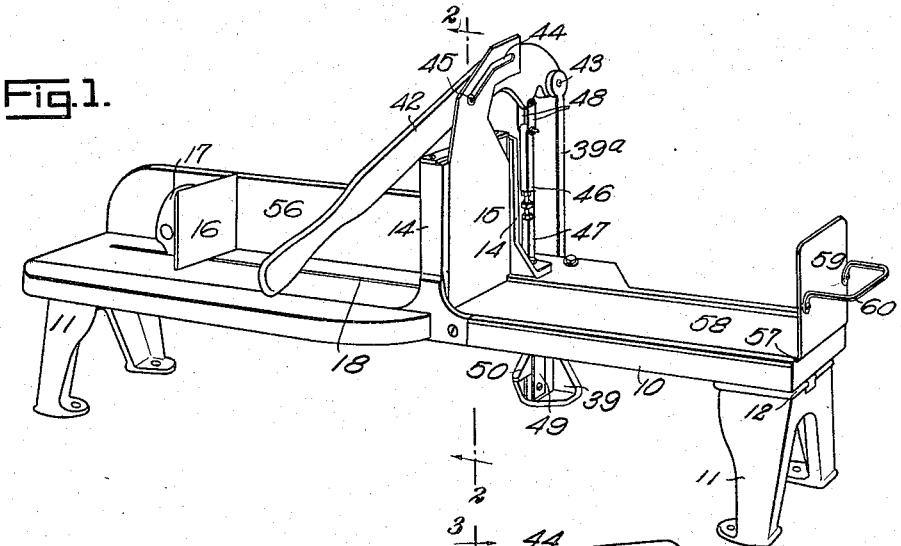

H. A. MASON.
ICE CREAM CUTTING MACHINE.
APPLICATION FILED NOV. 5, 1915.

1,201,067.

Patented Oct. 10, 1916.
2 SHEETS—SHEET 1.

WITNESSES

INVENTOR
Hosea A. Mason
BY
ATTORNEYS

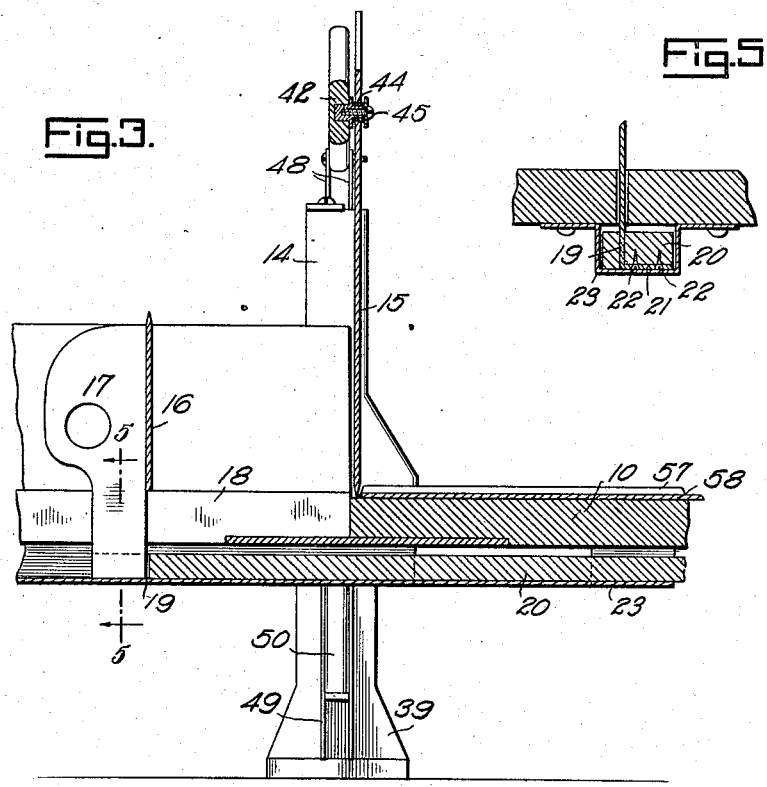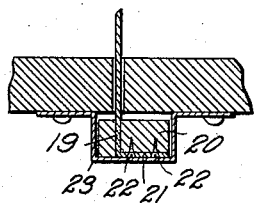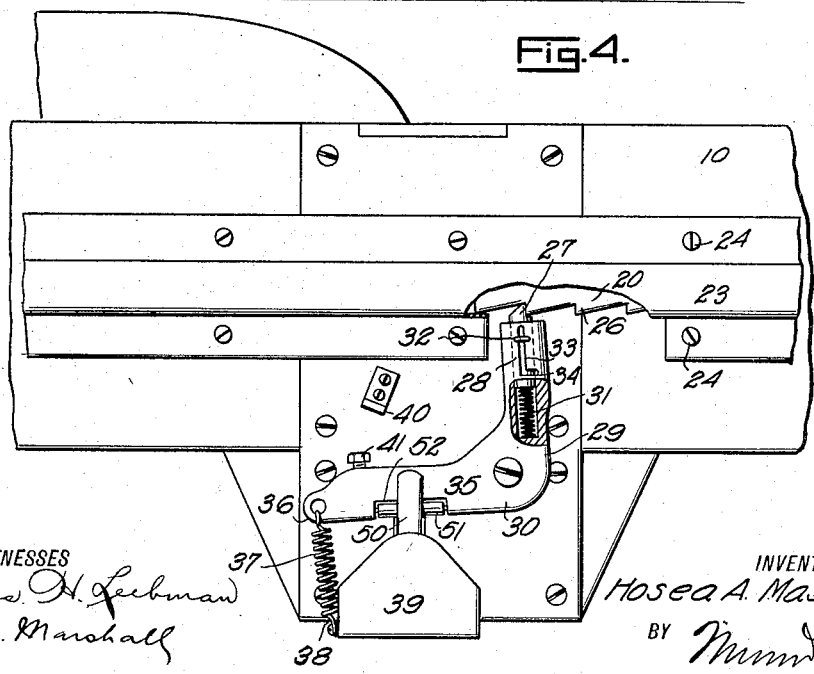

UNITED STATES PATENT OFFICE.

HOSEA ALFRED MASON, OF TAUNTON, MASSACHUSETTS, ASSIGNOR OF ONE-HALF TO WILLIAM E. QUIGLEY, OF TAUNTON, MASSACHUSETTS.

ICE-CREAM-CUTTING MACHINE.

1,201,067.        Specification of Letters Patent.      Patented Oct. 10, 1916.

Application filed November 5, 1915. Serial No. 59,755.

*To all whom it may concern:*

Be it known that I, HOSEA A. MASON, a citizen of the United States, and a resident of Taunton, in the county of Bristol and State of Massachusetts, have invented a new and Improved Ice-Cream-Cutting Machine, of which the following is a full, clear, and exact description.

My invention has for its object to provide an ice cream cutting machine which is adapted to cut a pack or brick of ice cream as may be desired, the thickness of the cut portions of the ice cream being uniform and being regulated by means provided.

The machine may be operated as rapidly or as slowly as desired. When operating, the machine pushes the cut portions of ice cream on a tray, which may be replaced by another tray when the first tray has been filled and is removed.

Still other objects of the invention will appear in the following specification, in which the preferred form of the invention is described.

In the drawings similar reference characters refer to similar parts in all the views, in which—

Figure 2:
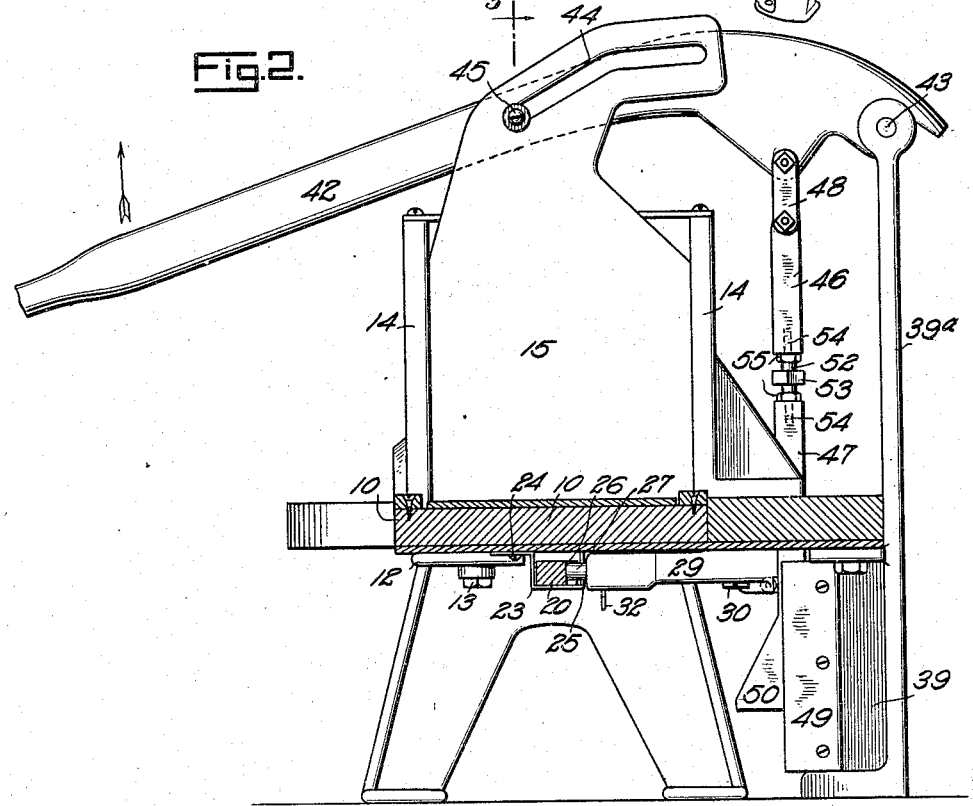

Figure 1 is a perspective view of the ice cream cutting machine; Fig. 2 is a sectional view on the line 2—2 of Fig. 1; Fig. 3 is a sectional view on the line 3—3 of Fig. 2; Fig. 4 is an inverted plan view, illustrating the means for operating the rack; and Fig. 5 is a sectional view on the line 5—5 in Fig. 3.

By referring to the drawings, it will be seen that a table 10 is provided, which is supported by two pairs of legs 11, the said pairs of legs 11 having flanges 12 on which the table rests, the said table 10 being secured to the said flanges 12 by means of the bolts 13. Disposed on the table and spaced apart, there are two vertical guides 14, in which the cutter 15 is disposed, this cutter 15 being provided for cutting the packs or bricks of ice cream in a manner which will shortly be described. The bricks or packs of ice cream are moved in the direction of the cutter 15 by the follower 16, which has a rearwardly extending portion 17, which is disposed in the longitudinal slot 18 in the table 10. This portion 17 of the follower extends through a slot 19 in a rack bar 20 and is turned under the bottom of the rack bar at 21 and is secured thereto by the screws 22, so that the follower 16 may be moved in the direction of the cutter 15 by means of the rack bar 20.

The rack bar 20 is supported on the rack guide 23, which is secured to the bottom of the table 10 by means of the screws 24, the said rack guide 23 having its side 25 cut away to expose the rack teeth 26, which are adapted to be engaged one at a time by the beveled tooth 27, which is mounted in a slot 28 in the arm 29 of a bell crank lever 30, the beveled tooth 27 being held extended and in engagement with the tooth surface of the rack bar 20, by means of a spring 31, so that when the bell crank lever 30 is rocked it will when moved in one direction, force the rack bar 20 ahead, while in its return movement, the bevel on the tooth 27 will permit the tooth to pass the next tooth for engagement therewith on its return movement. As a means for holding the beveled tooth 27 inwardly and out of engagement with the teeth of the rack bar 20, I provide the tooth 27 with a pin 32, which is disposed in the bayonet slot 33 in the arm 29 of the bell crank lever 30, so that it may be readily engaged to move the tooth 27 inwardly, it being possible to move the pin 32 in the angular portion 34 of the bayonet slot 33, so that the tooth 27 will be held inward when it is desired to move the rack bar 20 to a position, where the follower 16 secured thereto will be spaced from the cutter 15 to permit the insertion of a brick or pack of ice cream between the said follower 16 and the cutter 15. The other arm 35 of the bell crank lever 30, has secured to it, the end 36 of a spring 37, the other end 38 of the said spring being secured to a leg 39, so that the bell crank lever 30 will be held yieldingly with its extended tooth 27 in engagement with the teeth of the rack bar 20. The movement of the bell crank lever 30 is limited by the stop 40, with which the screw 41 on the arm 35 of the bell crank lever 30 is adapted to engage, it being possible to turn this screw 41 as desired for the purposes of adjustment. The leg 39 is secured to the table 10 and extends above the said table 10 at $39^a$, a handle 42 being pivoted to this portion $39^a$ of the leg 39 at 43. The cutter 15 has a slot 44 which is preferably made in angular form and in this slot 44, there is disposed a stud 45, which is secured to the pivoted handle 42. By this means, the cutter 15 is raised when the handle 42 is moved upwardly. Connected with the handle 42 there is a bar, which is preferably constructed of sections 46 and 47, the section 46 of the bar being connected with the pivoted handle 42 by links 48. The section 47 of the bar is disposed for moving in a guide 49, which is secured to and extends inwardly from the leg 39. This bar section 47 has a cam 50 for engaging a roller 51 journaled in a recess 52 in the arm 35 of the bell crank lever 30. It will therefore be seen that when the pivoted handle 42 is moved upwardly, it will raise the cutter 15 and that at the same time, it will raise the bar sections 46 and 47 by means of the links 48, and when the bar section 47 has been raised a predetermined distance, its cam 50 will engage the roller 51 to operate the bell crank lever 30 and move the rack bar 20 by means of the tooth 27. When the handle is lowered, it will move the cutter 15 downwardly to sever the brick or pack of ice cream and with this downward movement of the handle 42 the bar section 47 will be moved downwardly to bring its cam 50 out of engagement with the roller 51. When this takes place, the bell crank lever 35 will be free to move under the influence of the spring 37, so that the tooth 27 will pass rearwardly of the rack bar 20 to engage another rack tooth.

The bar sections 46 and 47 are connected together by a screw 52, which may be turned by the engagement of a wrench at its central angular portion 53, this screw 52 meshing in threaded orifices 54 in the bar sections 46 and 47, lock nuts 55 being provided, which mesh with the screw 52 and press against the ends of the bar sections 46 and 47 to hold the screw 52 relatively to the bar sections 46 and 47 in adjusted position. By this means the length of the bar having the sections 46 and 47 may be adjusted.

Detachably secured to the table 10 and disposed parallel with the slot 18 there is a side bar 56, which is normally disposed as illustrated in Fig. 1 of the drawings. As has been stated the brick or pack of ice cream is moved from one side of the cutter 15 between the guides 14 to be severed by the cutter 15. The table 10 at the other side of the cutter 15 is provided with a channel 57 in which a tray 58 is normally disposed, this tray 58 being provided for receiving the cut portions of ice cream and being provided with an end wall 59 and a handle 60.

Having thus described my invention, I claim as new and desire to secure by Letters Patent:—

1. In an ice cream cutting machine, a table, a cutter, a rack, means by which the rack is adapted to move the material to be cut along the table in the direction of the cutter, a pivoted lever having a tooth for advancing the rack, a handle disposed above the table and pivoted on a horizontal axis, a vertically moving cam disposed below the handle for engaging an arm of the lever for operating the latter, cam operating means articulated to the handle and depending therefrom, the cam operating means being connected with the cam for operating the latter, and means by which the handle is adapted to operate the cutter.

2. In an ice cream cutting machine, a table, a rack, a follower on the table and secured to the rack, a lever fulcrumed to the table and having a tooth for engaging the rack teeth for advancing the rack, adjustable means for limiting the movement of the lever, a cam for engaging the lever for operating the latter, adjustable means for operating the cam, and an operating handle to which the adjustable means is articulated.

3. In an ice cream cutting machine, a pivoted lever, a rack having its teeth disposed in the direction of the axis of the lever, a tooth on the lever for engaging the rack teeth for advancing the latter, resilient means for holding the lever yieldingly with its tooth in engagement with the rack, a cam for moving vertically and substantially parallel with the axis of the lever for engaging an arm of the lever for operating the latter, a handle disposed above the cam, means articulated to the handle and depending therefrom which connects the handle with the cam for operating the latter, means for holding the tooth yieldingly extended on the lever, and means by which the rack is adapted to move forward the material to be operated on.

4. In an ice cream cutting machine, a rack, means by which the rack is adapted to move forward the material to be operated on, a pivoted lever having a tooth for engaging the rack teeth for advancing the rack, a vertically moving cam for engaging the lever to operate the latter, a vertically moving cutter, a handle disposed above the cam, means articulated to the handle and depending therefrom which connects the handle with the cam for operating the latter, and operating means connecting the handle with the cutter.

5. In an ice cream cutting machine, a rack, means by which the rack is adapted to move forward the material to be operated on, a pivoted lever having a tooth for engaging the rack teeth for advancing the rack, resilient means for holding the lever yieldingly with its tooth in engagement with the rack, a cam for moving vertically and substantially parallel with the axis of the lever for engaging an arm of the lever for operating the latter, a pivoted handle disposed above the cam, and means depending from the handle and connected with the cam for the purpose specified.

6. In an ice cream cutting machine, a pivoted handle disposed horizontally, a vertically moving cutter provided with a slot, the pivoted handle having a stud disposed in the slot for operating the cutter, a rack, means by which the rack is adapted to move the material to be cut, a pivoted lever having a tooth for engaging the rack teeth, a vertically moving cam disposed below the handle for engaging an arm of the lever for operating the latter, and operating means depending from the handle and connected with the cam for the purpose specified.

7. In an ice cream cutting machine, a cutter, a rack, means by which the rack is adapted to move relatively to the cutter the material to be cut, a pivoted lever having a tooth for engaging the rack teeth for advancing the rack, means for holding the tooth yieldingly extended on the lever, resilient means for holding the lever yieldingly with its tooth in engagement with the rack teeth, a cam for moving substantially parallel with the axis of the lever for engaging an arm of the lever to operate the latter, a handle pivoted on an axis substantially at right angles to the axis of the lever, means depending from the handle and connected with the cam for operating the latter, and means by which the handle is adapted to operate the cutter.

8. In an ice cream cutting machine, a pivoted handle, guides, a cutter for moving in the guides and provided with a slot, a stud on the handle disposed in the slot for operating the cutter, a rack, means by which the rack is adapted to move material to be cut, a pivoted lever, a tooth mounted on the lever, resilient means for holding the lever yieldingly with the tooth at the teeth of the rack, resilient means for holding the tooth yieldingly extended and in engagement with the rack teeth, another guide disposed substantially parallel with the first guides, a rod disposed in the said other guide and having a cam for engaging the lever for rocking the latter, and a link connecting the handle with the rod for operating the rod.

9. In an ice cream cutting machine, a table having a longitudinally extending slot, a handle pivoted relatively to the table, guides, a member for moving in the guides and provided with an elongated slot, a stud on the handle disposed for moving in the slot for operating the handle, a rack disposed under the table, a follower disposed on the table and having a depending part for traveling in the slot in the table and secured to the rack, a pivoted lever, a tooth mounted on the lever, resilient means for holding the lever yieldingly with the tooth at the teeth of the rack, resilient means for holding the tooth yieldingly extended and against the teeth on the rack, another guide disposed substantially parallel with the first guides, a rod disposed in the said other guide and having a cam for engaging the lever for rocking the latter, and a link connecting the handle with the rod for moving the rod in the said guide.

10. In an ice cream cutting machine, a table having a longitudinally extending slot, a handle pivoted relatively to the table, guides, a member for moving in the guides and provided with an elongated slot, a stud on the handle disposed for moving in the slot for operating the handle, a rack disposed under the table, a follower disposed on the table and having a depending part for traveling in the slot in the table and secured to the rack, a pivoted lever, a tooth mounted on the lever, resilient means for holding the lever yieldingly with the tooth at the teeth of the rack, resilient means for holding the tooth yieldingly extended and against the teeth on the rack, another guide disposed substantially parallel with the first guides, a rod disposed in the said other guide and having a cam for engaging the lever for rocking the latter, and a link connecting the handle with the rod for moving the rod in the said guide, there being a channel in the table at one side of the cutter and a removable tray normally disposed in the channel in the table.

11. In an ice cream cutting machine, means to move forward the material to be operated on, a pivoted lever having means for operating the first mentioned means, a vertically moving cam for engaging the lever to operate the latter, a vertically moving cutter, a transversely disposed handle extending above the cam, means depending from the handle and connected with the cam for operating the latter, and means by which the handle is adapted to operate the cutter.

In witness whereof I have signed my name to this specification in the presence of two subscribing witnesses.

HOSEA ALFRED MASON.

Witnesses:
PETER F. QUIGLEY,
CHARLES FRANKLIN ROUNDS.

Copies of this patent may be obtained for five cents each, by addressing the "Commissioner of Patents. Washington, D. C."